United States Patent
Nelson et al.

(10) Patent No.: US 8,601,573 B2
(45) Date of Patent: Dec. 3, 2013

(54) FACIAL RECOGNITION FOR DOCUMENT AND APPLICATION DATA ACCESS CONTROL

(75) Inventors: Mark Nelson, Poughkeepsie, NY (US); Kevin H. Peters, Poughkeepsie, NY (US); Louis R. Ruggiero, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 12/561,639

(22) Filed: Sep. 17, 2009

(65) Prior Publication Data

US 2011/0067098 A1    Mar. 17, 2011

(51) Int. Cl.
G06F 7/04     (2006.01)
G06F 21/62    (2013.01)

(52) U.S. Cl.
CPC .................................. *G06F 21/6218* (2013.01)
USPC ............................................................ 726/21

(58) Field of Classification Search
USPC ........................ 713/186; 726/1, 2, 17, 21, 28
See application file for complete search history.

(56) References Cited

U.S. PATENT DOCUMENTS

| | | | |
|---|---|---|---|
| 5,991,429 A | 11/1999 | Coffin et al. | |
| 6,111,517 A | 8/2000 | Atick et al. | |
| 6,681,032 B2 | 1/2004 | Bortolussi et al. | |
| 7,260,726 B1 | 8/2007 | Doe et al. | |
| 7,506,163 B2 | 3/2009 | Mansz et al. | |
| 7,523,860 B2 | 4/2009 | Bonalle et al. | |
| 2001/0023486 A1* | 9/2001 | Kayashima et al. | 713/200 |
| 2004/0193912 A1* | 9/2004 | Li et al. | 713/200 |
| 2005/0066192 A1* | 3/2005 | Bosma et al. | 713/201 |
| 2005/0081063 A1* | 4/2005 | Patrick et al. | 713/201 |
| 2006/0267763 A1 | 11/2006 | Rao | |
| 2007/0150827 A1 | 6/2007 | Singh et al. | |
| 2007/0271592 A1 | 11/2007 | Noda et al. | |

FOREIGN PATENT DOCUMENTS

EP    1429558 A2    6/2004

OTHER PUBLICATIONS

International Search Report; International Application No. PCT/EP2010/063480; International Filing Date: Sep. 14, 2010; Date of Mailing: Dec. 27, 2010.
International Search Report—Written Opinion ; International Application No. PCT/EP2010/063480; International Filing Date: Sep. 14, 2010; Date of Mailing: Dec. 27, 2010.
IBM; IPCOM000177558D; IP.Com; 2 pages; Dec. 18, 2008.
IBM; IM Presence Detector; Apr. 13, 2009; pp. 4.

* cited by examiner

*Primary Examiner* — Peter Shaw
(74) *Attorney, Agent, or Firm* — Cantor Colburn LLP; William A. Kinnaman, Jr.

(57) ABSTRACT

A presentation system including a computing device, a display device coupled to the computing device and an image capture device that obtains an image containing facial images of at least two individuals capable of viewing the display device, the at least two individuals including a primary user and at least one secondary user, is provided. The system also includes a recognition apparatus operably coupled to the computing device and including a permission engine, the permission engine applying a policy to a protected information element displayed on the display screen, the policy causing one or more actions to be taken based on the identify of the primary and one or more of the secondary users.

13 Claims, 4 Drawing Sheets

FACIAL RECOGNITION FOR DOCUMENT AND APPLICATION DATA ACCESS CONTROL

BACKGROUND

The present invention relates to security, and more specifically, to security for computer stored information that may be viewed on a computing device.

With the vast increase of personal, electronic and wireless technologies available to individuals, virtually everyone uses at least one computing device. Examples of such computing devices includes laptop and personal computers, personal digital assistants (PDAs), cellular telephones, automated teller machines (ATMs), kiosks, etc. Each of these, and other, devices may at times displays confidential or personal information.

To protect the information stored in the computing device or to which the computing device may have access, methods to authenticate the user, such as passwords and the like have been employed. In many situations, however, other non-authorized individuals may be able to visually snoop to view sensitive or private data such as, for example, intellectual property, commercial information, confidential data, client data, employee/Human Relations data, financial information or other personal data. The criticality of this issue is demonstrated by the inclusion of "over the shoulder snooping" in recent lists of information security threats.

Further, the above problems are not just limited to personal devices. The same problems may also exist in the workplace where sensitive information may be displayed on a worker's computer screen such that non-authorized persons may view the information via over the shoulder snooping or when the person is not present.

Facial recognition has been used in some cases to help secure sensitive information or documents (collectively or individually referred to as a "sensitive document" herein). In such systems, a primary user of a particular computing device is designated and the device will not display any documents or run any application programs unless the primary user is present. These systems utilize an image capture device to scan a users face and compare it to a digital description of the primary user's face. In the event the two don't match, the system is "locked down" and no documents are displayed nor may any applications be run on the computing device. One way in which this is accomplished is disable any documents (either sensitive or not) from being displayed if the primary user is not present.

SUMMARY

According to one embodiment of the present invention, a presentation system including a computing device, a display device coupled to the computing device and an image capture device that obtains an image containing facial images of at least two individuals capable of viewing the display device, the at least two individuals including a primary user and at least one secondary user is provided. The system also includes a recognition apparatus operably coupled to the computing device and including a permission engine, the permission engine applying a policy to a protected information element displayed on the display screen, the policy causing one or more actions to be taken based on the identify of the primary and one or more of the secondary users.

Another embodiment of the present invention is directed to a computer-based method of controlling access to one or more protected information elements is provided. The method includes determining that a primary user is in the field of view of an image capture device; assigning a first protected information element policy to a protected information element based on an identity of the primary user; determining that a secondary user is in the field of view of the image capture device; assigning a second protected information element policy to a protected information element based on an identity of the secondary user; and providing access to the protected information element based on rules in the second protected information policy for as long as the secondary user is present in the field of view of the image capture device.

Another embodiment of the present invention is directed to a computer-based method of controlling access to one or more protected information elements, the method comprising: assigning a protected information element policy to a protected information element based at least on an identity of a primary user; determining that an unauthorized user had visual access to the protected information element; applying a policy containing one or more rules; and storing one or more instances in an audit engine where a rule of a particular policy was applied.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention are directed to providing security to protected information capable of being displayed on a computing device. The term "protected information" may include information to which a protected status has been assigned. In one embodiment, the present invention may determine the identity of persons who may view or otherwise interact with the protected information. The protected information may be displayable on a display screen. The protected information may be contained on the display screen in either a document or displayed as part of the running of an application or refer to a URL (or portion of a URL such as a domain name) and the term "protected information element" shall refer to either a document or application. It shall be understood that a protected status may be applied to a protected information element. Accordingly, a protected status may be applied to either or both an application or a document according to embodiments of the present invention.

In one embodiment, the protection is applied with respect to those who may visually observe (view) a protected information element. If a primary user is the only person in the field of view, the operation of the system is not effected. In the event that the others (secondary viewers or users) may observe the protected information element, however, a policy may be implemented. In particular, the policy may include one or more actions (rules) to be implemented based on the persons present. These policies may override the authorized user's rights with respect to the protected information element. Embodiments of the present invention may help to ensure that non-authorized individuals (besides the primary authorized user) are not able to view information for which they lack authorization. In one embodiment, a display device does not allow non-authorized individuals to view the protected information.

The present invention may be implemented on any computing device. In some embodiments, portions of the computing device that form a system according to various embodiments may be distributed among many computing devices. In one embodiment, the user may only have a display device (e.g., computer or other device screen) and a device capable of capturing images (e.g., a camera) present in the same location as the primary user. All other processing may be performed at a remote location. For ease of description, it shall be assumed, however, that the image capturing device is coupled to a computing device having at least rudimentary processing capabilities and that both devices are proximate the primary user.

Figure 1:
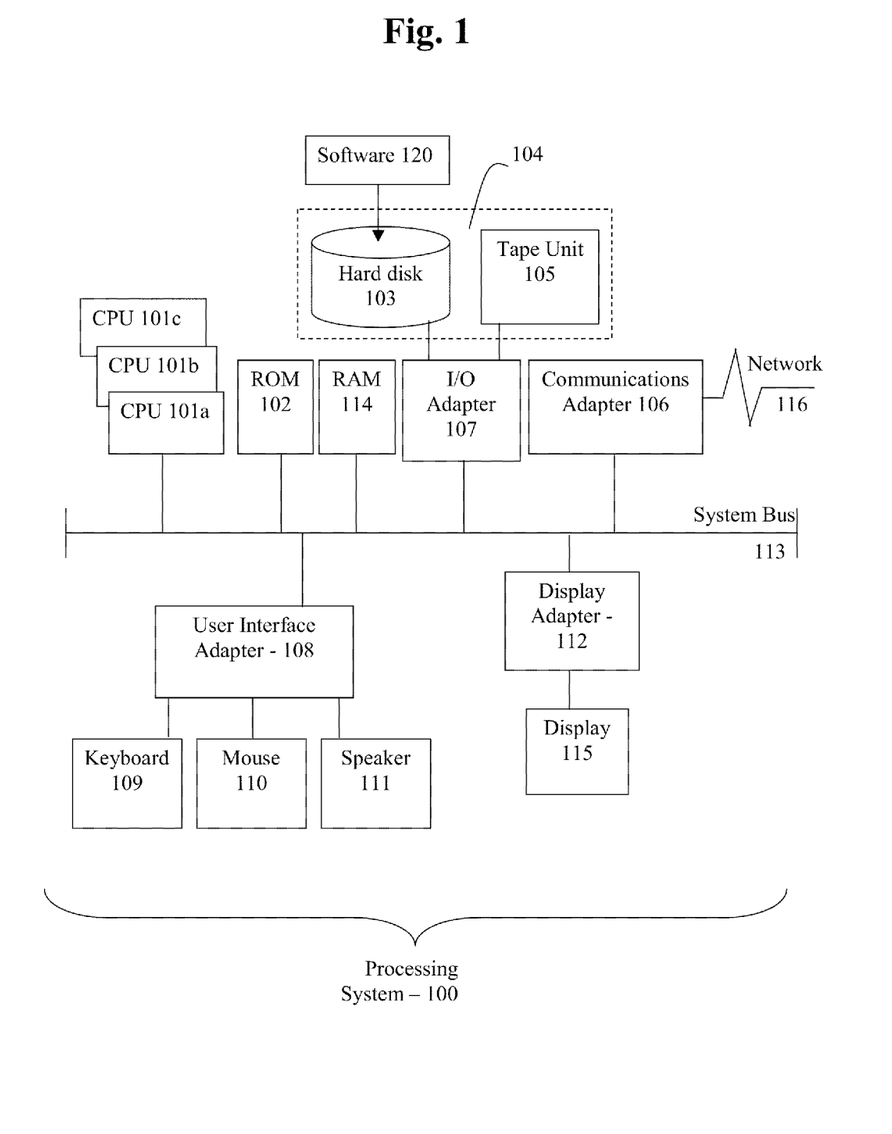
FIG. 1 shows an example of computing device which may be utilized in the present invention.

FIG. 1 shows an example of a computing device 100 which may be utilized in one embodiment. In this embodiment, the device 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling device 100 to communicate with other such devices or systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, image capturing devices such as digital cameras, video cameras, and the like, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the device 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the device 100 can be any suitable computer or computing platform, and may include a terminal, wireless device, information appliance, device, workstation, mini-computer, mainframe computer, personal digital assistant (PDA), cellular telephone, ATM machine or other computing device. It shall be understood that the device 100 may include multiple computing devices linked together by a communication network. For example, there may exist a client-server relationship between two systems and processing may be split between the two.

For sake of clarity, the device 100 shown has multiple inputs and outputs and processors. However, FIG. 1 is illustrative only and embodiments of the present invention may not require all of the elements disclosed in FIG. 1.

Examples of operating systems that may be supported by the system 100 include Windows 95, Windows 98, Windows NT 4.0, Windows XP, Windows 2000, Windows CE, Windows Vista, Mac OS, Java, AIX, LINUX, and UNIX, or any other suitable operating system. The system 100 also includes a network interface 106 for communicating over a network 116. The network 116 can be a local-area network (LAN), a metro-area network (MAN), or wide-area network (WAN), such as the Internet or World Wide Web.

Users of the device 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the device 100 includes machine-readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

Figure 2:
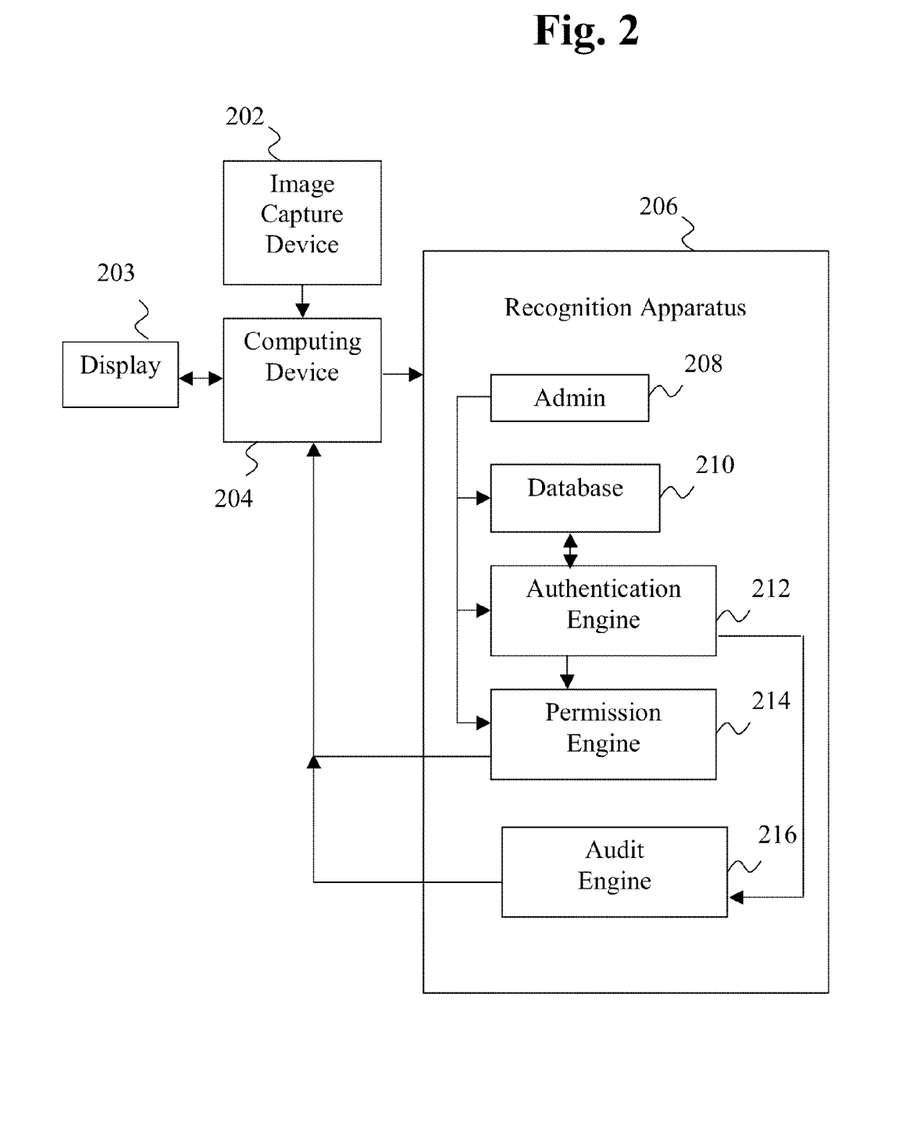
FIG. 2 shows a block diagram of system according to one embodiment of the present invention.

FIG. 2 is a block diagram showing a system 200 according to an embodiment of the present invention. The system 200 includes an image capture device 202. The image capture device 202 may be a digital camera or digital video camera or any other type of device capable of creating a digital representation of a scene. Of course, the image capture device 202 may include components for converting a scene (either as viewed or from a picture (either digital or printed)) into a digital representation thereof. In one embodiment, the image capture device 202 may be capable of identifying portions of the scene that represent faces.

The system 200 also includes a computing device 204 operatively coupled to the image capture device 202. The coupling may be wireless or a direct connection. An example of a computing device 204 is shown, for example, in FIG. 1. The computing device 204 may be coupled to a display device 203. In one embodiment, the display device 203 and the image capture device 202 may be formed in the same housing. For example, the display device 204 may be a computer display screen having an image capture device 204 formed therein or coupled thereto. To that end, the field of view of the image capture device 204 may define the region in which persons may view the display device 204.

The system 200 also includes a recognition apparatus 206. The recognition apparatus 206 is responsible for carrying out some or all of the present invention. Some or all of the recognition apparatus 206 may be part of the computing device 204. Of course, all of the recognition apparatus 206 could be external to the computing device 204. For example, portions of the recognition apparatus 206 could be distributed among other computing devices located in geographic locations remote from the computing device 204.

The recognition apparatus 206 may include one or more of the following portions: an administration module 208, a facial database 210, an authentication engine 212, a permission engine 214 and an audit engine 216. Of course, accordingly to some embodiments, not all of these engines may be included. As discussed above, each protected information element has a policy associated therewith. The administration module 208 may be used to set the policy of each protected information element. The policy may include one or more rules defining actions to be taken or permission levels (or some combination of both) based on who is in the field of view. In addition, the administration module 208 may be used to add/delete facial profiles, add/delete resources, and add/delete actions and policies. In short, the administration module 208 may be used to set policies and rules and manage resources in the recognition apparatus 206 as a whole.

The database 210 includes information about individuals' faces as well as the polices for specific protected information elements. While the policies are stored in the database 210, it shall be understood that the administration module 208 applies the policies. In one embodiment, information is related to the facial features of allowed or non-allowed individuals or some combination thereof. That is, the database 210 contains information related to individuals for which information has been entered. For example, in the context of a company, the database 210 may include facial images for every employee of the company. In addition, the database 210 may include policies that are determined by facial profiles (image or representation), resources to be controlled and are based on access to resources (access lists, sensitivity labels, or other access policy).The "image" may be a digital representation of an individual's facial characteristics. In one embodiment, the image need only contain enough information for effective facial recognition.

The authentication engine 212 utilizes the information in the database 212 to determine if the individual(s) in the field of view of the image capture device 202 are in the database 210. The permission engine 214, based on results of the authentication engine 212, caused policies to implemented for the computing device 204 to effectuate policies related to open protected information elements.

In operation, the system 200 may operate, generally, as described below. Of course, modifications could be introduced without departing from the spirit of the present invention. Operation starts or continues when a protected information element is opened or remains open. The image capture device 202 is either continually or periodically sampling its field of view. The sampled image is then provided to the computing device 204 in one embodiment. Of course, the imagine capture device 202 could provide the sampled image directly to the recognition engine 206.

Regardless, the sampled image is processed by the recognition apparatus 206. The authentication engine 212, utilizing standard facial recognition (or matching) techniques, compares the facial information for the individual(s) in the field of view to facial information stored in the database 210. The authentication engine 212, in one embodiment, may determine that an individual is in the database 210 or not. If the individual is in the database, the identity of the person is provided to the permission engine 214. Otherwise, an indication that the person is not in the database 210 may be provided.

The permission engine 214, based on information received from the authentication engine 212, causes the rules forming the one more policies associated with the protected information element to be acted on. In addition, to the extent that a protected information element has more that one policy associated with it, the authentication which one or more policies should be activated. In one embodiment, the policies to be activated may be based on the identity of the secondary users in the field of view. Rules, as used herein, may include preventative actions that prevent certain actions or viewing from occurring.

The particular preventative action to be taken may be subject to policies that may be contained, for example, in the database 210. The policy may be applied, in one embodiment, by the administration module 208. These policies may include particular rules to be applied to a protected information element when a viewer other than the primary viewer may view the protected information element. This second level policy may, in one embodiment, override a primary user policy. The rules that may be utilized by a particular policy may include, for example, closing or minimizing a visual window containing the protected information element, altering the document to present misinformation, saving and/or closing an application, presenting a message (warning or otherwise) in the foreground (such as presenting a "Account Temporarily unavailable or disabled"), locking the screen, providing an audible warning, notifying a compliance/security officer, calling the police or bringing another document in front of the protected document. It should be understood that a particular document may have a policy that causes multiple rules to be implemented when an unauthorized viewer may view the screen. In one embodiment, other, non-sensitive, information may remain displayed. Of course, other preventive actions (or rules) that apply to particular documents may be applied and stored in the -database 210.

The above description that assumed that the preventative action is an action that prevents viewing of a document. The preventative actions (as contained in a policy associated with particular documents or document types) may also be used to implement a multi-tier security policy that provides a different level of authority than the primary authenticated user had or different from minimizing. In one embodiment, a least common denominator approach may be employed. For instance if the primary user had "write" authority to a specific resource and the policy for the resource allowed write authority when secondary user A was present but only allowed view access when secondary user B was present, the least common denominator would be view access (which is a different approach than just closing/minimizing the resource and would not disclose the fact that the primary user had write authority to secondary user B). Another embodiment may provide a greater level of authority than the primary authenticated user normally has. For example, an action could not be taken unless an authorized secondary person is present (for instance, when management approval of a transaction is required or when a dual turnkey approval is needed).

The recognition engine 206 may also include an audit engine 216. The audit engine 216 may be coupled to the authentication engine 212 and receive an indication of persons who viewed or attempted to view (whether in the database or not) a particular protected information element. In one embodiment, the audit engine 216 provides an audit trail of which secondary viewers actually viewed a protected information element. In one embodiment, the audit trail may include a timestamp of who was a secondary viewer as well as who was the primary authenticated user at the time of viewing. In one embodiment, the audit engine 216 may also record information regarding when preventive actions described above were taken, what action was taken and why (such as unidentified unauthorized person detected when a particular protected information element was active). In another embodiment, the audit engine 216 may aggregate the data it collects and use the aggregated data as a feedback mechanism to potentially change preventive policies. For example, the audit engine 216 may determine that if a particular resource has a number of preventive actions taken, should the policy been less restrictive, or if sensitive data is exposed too often should the policy be more restrictive, or if a particular recognized person which is unauthorized causes preventive actions to occur often. Additionally, this audit engine 216 itself, based on the aggregated data, could include instructions that allow it to take preventive actions (to notify a security group, etc).

Figure 3:
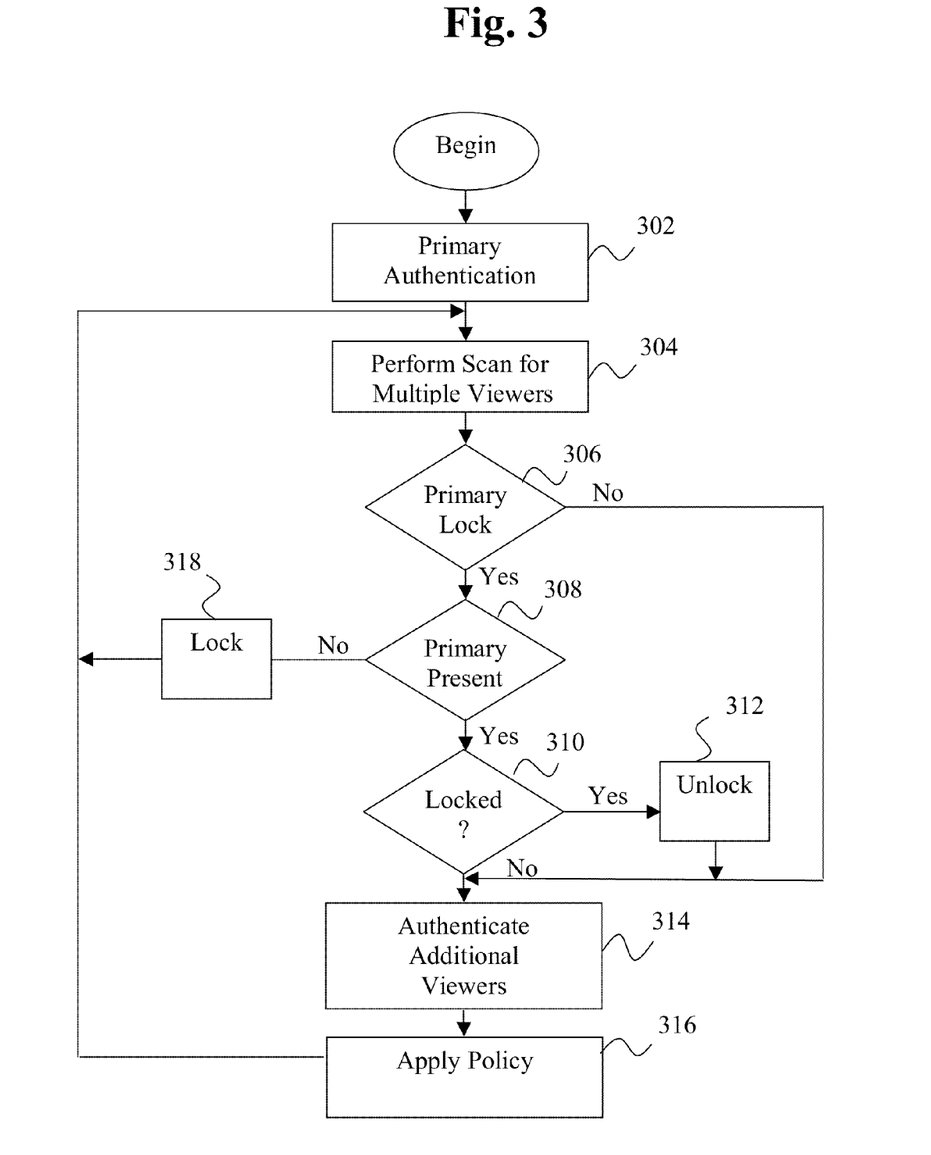
FIG. 3 is a flow chart showing method for utilizing facial recognition to protect information according to one embodiment of the present invention.

FIG. 3 is a flow chart showing method for utilizing facial recognition to protect sensitive information. The process may run when a particular protected information element is opened. The process may be repeated at periodic intervals, continually, or when the objects (i.e., individuals) in the field of view of the imaging capture device changes.

At a block 302, a primary user authentication may be performed. The primary user authentication may be performed to ensure that the primary user of the document is authorized to see the requested protected information element. It is assumed that only those in the field of view of the image capture device are capable of seeing the display screen of the computing device on which the protected information element is to be displayed. The processing at block 302 may include performing a facial scan of the user and matching it to a user in the database. If the match is found, the protected information element may be opened and/or displayed. In one embodiment, if the primary user leaves the field of view of the image capture device, the protected information element may not be opened or may be immediately closed. Of course, if another authorized person is present and the primary user leaves, the protected information element may not need to be closed. Again, the actions taken are all based on the policy being applied.

At a block 304, a facial scan for a scene containing multiple faces is performed. This may occur, for example, when a new individual enters the scene or on a periodic basis. Regardless, the facial scan compare the two or more faces (it being assumed the primary user is still in the scene) to the faces in the database.

At a block 306 it is determined if the primary user lock is on. A primary user lock is "on" if the system is configured such that documents may only be displayed if the primary user is in the field of view. If the primary user lock is not on, processing passes to a block 314. If it is not, at a block 308 it is determined if the primary user is present. If not, the system is locked at a block 318. Otherwise, at a block 310 it is determined if the system has previously been locked and, if so, at a block 312 it is unlocked. At a block 314, the additional viewers are authenticated and based on these results, at a block 316 a particular policy is applied that includes one or more rules. The rules may include, for example, allowing the viewers to see all windows except those they are not authorized to view. This may be accomplished, for example, by closing or minimizing the windows containing documents the additional viewers are not authorized to view. Referring again to FIG. 2, the authentication of block 314 may be performed by the authentication engine 212 and the rule application of block 316 may be applied by the permission engine 214. It shall be understood that the policy application of block 316 may implement any type of policy disclosed herein.

Figure 4:
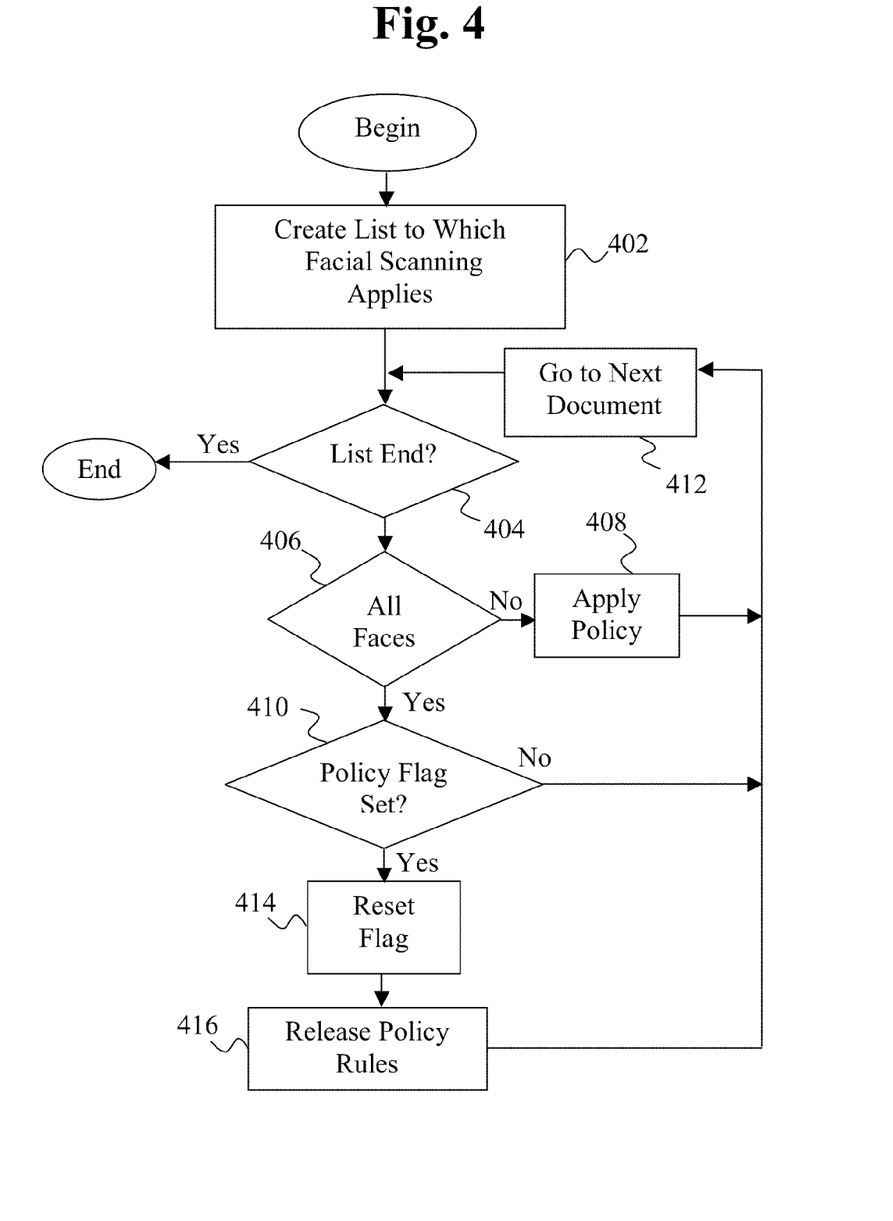
FIG. 4 is a block-diagram showing a method according to one embodiment of the present invention that may be performed by a permission engine for rule application.

FIG. 4 is a block-diagram showing a method according to one embodiment of the present invention. The method shown in FIG. 4 may be performed, for example, by the permission engine 214 (FIG. 2) with respect to the rule application performed in at block 316 of FIG. 3. The process shown in FIG. 4 may, in one embodiment, be performed each time block 316 is reached in the method shown in FIG. 4. Of course, in one embodiment, it could be run continuously.

At a block 402 a list or other collection of active protected information elements to which the facial scanning procedures applies is created. This may include, for example, determining all open documents. These open documents may then be compared to the database 210 (FIG. 2) to determine if a visual (facial) policy applies to it. Documents not in the database may have a default policy (such as "no access" full non-restricted access or other). It shall be understood that each time a document is opened the procedure of block 402 may be repeated and each time a document is closed it may be removed from the list. Further, in this example, documents are described but the teachings are equally applicable to applications.

At a block 404 it is determined if all of the documents in the list have been reviewed. If so, the process ends. Otherwise, at a block 406 it is determined if all of the faces in the field of view of the image capture device are authorized for the particular document being evaluated. If not, at block 408 a policy based on the users and the document is applied. After the policy is applied, the process goes to the next document in the list as indicated at block 412.

At a block 408, if all faces are authorized, it is determined if the document has had a flag set indicating a policy is to be applied. If not, the process goes to the next document in the list as indicated at block 412.

If a flag has been set, the flag is reset (released) at a block 414, and the rules specified by the policy are released at a block 416.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A presentation system comprising:
   a computing device, the computing device having a primary user associated with it;
   a display device coupled to the computing device;
   an image capture device that obtains an image containing facial images of at least two individuals capable of viewing the display device, the at least two individuals including the primary user and at least one secondary user;
   a facial recognition system that identifies the primary user and the secondary user;
   a recognition apparatus operably coupled to the computing device and including a permission engine, the permission engine applying a policy to a protected document displayed on the display screen, the policy causing one or more preventative actions to be taken based on the identity of the primary and one or more of the secondary users determined by the facial recognition system and only displaying the protected document when the primary user is in the image;
   an audit engine that records information regarding the identity of the primary and one or more of the secondary users when the one or more preventive actions were taken and aggregates the information; and
   an administrative module that causes changes to the policy in the permission engine based on the aggregated information, wherein changing includes making the policy more or less restrictive based on a number of preventative actions taken.

2. The presentation system of claim 1, wherein the permission engine allows information other than the protected document to be viewed in the event that the secondary user is not authorized to view the protected document.

3. The presentation system of claim 1, wherein the permission engine overrides rights of the primary users with respect to the protected document based on the identity of the one or more secondary users.

4. The presentation system of claim 1, wherein the protected document is associated with a first policy based on the identity of the primary user and is associated with a second policy based on an identity of one or more of the secondary users, the second policy overriding the first policy.

5. The presentation system of claim 1, wherein the recognition apparatus further includes:
   a database containing information describing faces of authorized viewers of the protected document; and
   an authorization engine that compares faces in the image with the information in the database and provides an indication of results of the comparison to the permission engine.

6. The presentation system of claim 1, wherein the recognition apparatus is part of the computing device.

7. A computer-based method of controlling access to one or more protected information elements, the method comprising:
   determining, with a facial recognition device, that a primary user is in the field of view of an image capture device, wherein the primary user is specifically associated with a computing device in operable communication with the image capture device;
   assigning a first protected information element policy to a protected document based on an identity of the primary user;
   determining that a secondary user is in the field of view of the image capture device;
   identifying the secondary user with facial recognition device;
   assigning a second protected information element policy to the protected document based on the identity of the secondary user;
   providing access to the protected document based on rules in the second protected information element policy for as long as both the primary and the secondary user are present in the field of view of the image capture device;
   recording in an audit engine information regarding the identify of secondary user when access was not provided;
   aggregating the information regarding when and why access was not provided; and
   changing the second protected information element policy based on the aggregated information, wherein changing includes making the second protected information policy more or less restrictive based on a number of preventative actions taken.

8. The method of claim 7, wherein determining includes comparing user faces in the field of view with information about authorized users' faces contained in a database.

9. The method of claim 7, further including:
   performing facial recognition of the face of the primary user; and
   performing facial recognition of the face of the secondary user.

10. The method of claim 7, wherein the second protected information policy disallows the secondary user from viewing the protected document.

11. The method of claim 10, wherein other documents or applications may be viewed while viewing of the protected document is disallowed.

12. The method of claim 7, further comprising:
   determining that a third user, the secondary user and the primary user are in the field of view of the image capture device; and
   assigning a third protected information element policy to a protected document based on an identity of the third user.

13. The method of claim 12, wherein the third policy is applied until the third user leaves the field of view of the image capture device.

* * * * *